United States Patent
Yoshizumi et al.

(10) Patent No.: US 10,446,857 B2
(45) Date of Patent: Oct. 15, 2019

(54) FUEL CELL AND MANUFACTURING METHOD OF FUEL CELL

(71) Applicant: TOYOTA JIDOSHA KABUSHIKI KAISHA, Toyota-shi, Aichi-ken (JP)

(72) Inventors: Tomoo Yoshizumi, Toyota (JP); Takashi Kondou, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 718 days.

(21) Appl. No.: 14/861,120

(22) Filed: Sep. 22, 2015

(65) Prior Publication Data
US 2016/0093901 A1    Mar. 31, 2016

(30) Foreign Application Priority Data
Sep. 25, 2014  (JP) .................................. 2014-194930

(51) Int. Cl.
| | | |
|---|---|---|
| *H01M 8/0273* | (2016.01) | |
| *H01M 8/0276* | (2016.01) | |
| *H01M 8/023* | (2016.01) | |
| *H01M 8/0247* | (2016.01) | |

(52) U.S. Cl.
CPC ......... *H01M 8/0273* (2013.01); *H01M 8/023* (2013.01); *H01M 8/0276* (2013.01); *H01M 8/0247* (2013.01); *Y02P 70/56* (2015.11)

(58) Field of Classification Search
None
See application file for complete search history.

(56) References Cited

U.S. PATENT DOCUMENTS

| | | | | |
|---|---|---|---|---|
| 2003/0148164 A1* | 8/2003 | Koch | .................. | H01M 8/0243 429/535 |
| 2006/0286429 A1* | 12/2006 | Shiepe | ..................... | C25B 9/08 429/514 |
| 2009/0130537 A1* | 5/2009 | Osada | ................. | H01M 8/0228 429/437 |
| 2010/0183944 A1* | 7/2010 | Ogawa | ................ | H01M 8/0247 429/483 |

(Continued)

FOREIGN PATENT DOCUMENTS

| | | |
|---|---|---|
| JP | 2008-4420 | 1/2008 |
| JP | 2009-218190 A | 9/2009 |

(Continued)

*Primary Examiner* — Jeremiah R Smith
(74) *Attorney, Agent, or Firm* — Finnegan, Henderson, Farabow, Garrett & Dunner, LLP

(57) ABSTRACT

A fuel cell includes: a membrane electrode assembly; a porous member arranged on a cathode side of the membrane electrode assembly and having a first surface, a second surface, and an end surface portion, the end surface portion being between an end side portion of the first surface and the second surface; a sealing plate arranged along the end side portion of the first surface; and a separator plate arranged on the second surface. The porous member supplies oxidant gas to the membrane electrode assembly through the first surface, and discharges oxidant off-gas to a discharge portion of the fuel ceil via the end surface portion. The first surface has a first region facing the sealing plate and being between the sealing plate and the second region, the second surface has a second region. A hydrophilicity of the first region is different from that of the second region.

7 Claims, 14 Drawing Sheets

(56) References Cited

U.S. PATENT DOCUMENTS

2013/0260281 A1   10/2013   Sato

FOREIGN PATENT DOCUMENTS

| | | |
|---|---|---|
| JP | 2010-61991 | 3/2010 |
| JP | 2011-65813 | 3/2011 |
| JP | 2012-123949 | 6/2012 |
| JP | 2013-187030 A | 9/2013 |
| JP | 2013-191502 A | 9/2013 |

* cited by examiner

F I G. 7A
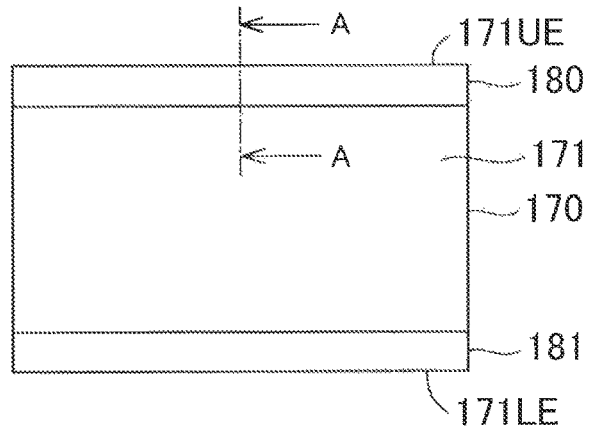
F I G. 7B
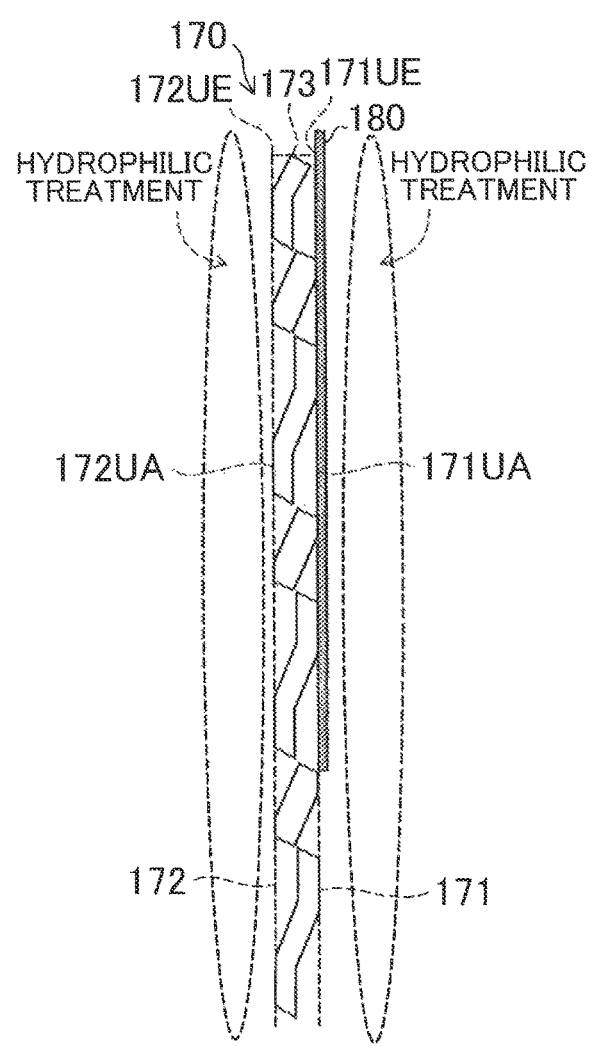

F I G . 8
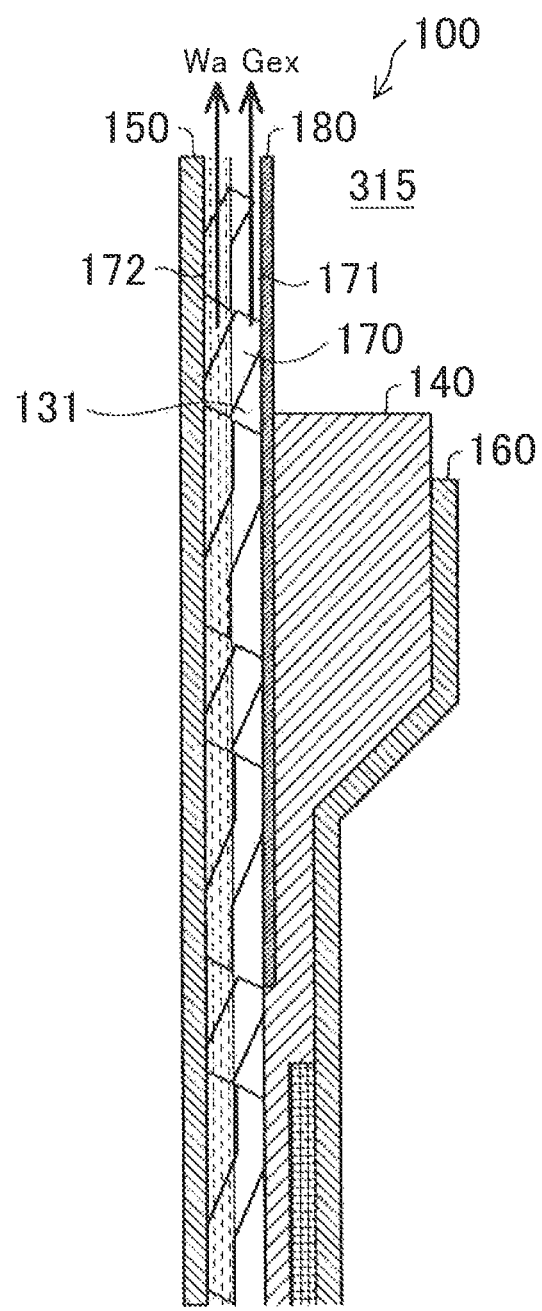

FUEL CELL AND MANUFACTURING METHOD OF FUEL CELL

INCORPORATION BY REFERENCE

The disclosure of Japanese Patent Application No. 2014-194930 filed on Sep. 25, 2014 including the specification, drawings and abstract is incorporated herein by reference in its entirety.

BACKGROUND OF THE INVENTION

1. Field of the Invention

The invention relates to a fuel cell and a manufacturing method of a fuel cell.

2. Description of Related Art

Japanese Patent Application Publication No. 2012-123949 (JP 2012-123949 A) describes a fuel cell that includes a porous member that forms a flow path to supply oxidant gas to a membrane electrode assembly, a sealing plate chat is arranged on one surface of the porous member, and a separator plate that is arranged on the other surface of the porous member. This fuel cell discharges water produced as a result of generating power, outside the fuel cell via the flow path formed by the porous member.

However, in the flow path formed by the porous member, water may remain in a portion of the porous member that is sandwiched between the sealing plate and the separator plate, due to the produced water adhering to both the sealing plate and the separator plate. When water remains in this portion, power generating performance may decrease due to pressure loss of the oxidant off-gas discharged via this portion.

SUMMARY OF THE INVENTION

The invention may be realized in the form described below.

One aspect of the invention relates to a fuel cell. This fuel cell includes a membrane electrode assembly; a porous member that has a first surface, a second surface, and an end surface portion, the first surface and the second surface being on opposite sides of the porous member, the first surface being arranged on a cathode side of the membrane electrode assembly, the end surface portion being between an end side portion of the first surface and an end side portion of the second surface; a sealing plate arranged along the end side portion of the first surface; and a separator plate arranged on the second surface, wherein the porous member is configured to supply oxidant gas to the membrane electrode assembly through the first surface, and discharge oxidant off-gas to a discharge portion of the fuel cell via the end surface portion; and the first surface has a first region that faces the sealing plate, the second surface has a second region, the first region is between the sealing plate and the second region, and a hydrophilicity of the first region is different from a hydrophilicity of the second region. According to this structure, water produced by power generation flows along whichever side, i.e., the first surface side or the second surface side, has the higher hydrophilicity, and oxidant off-gas flows on the other side, at the portion of the porous member that is sandwiched between the sealing plate and the separator plate. As a result, the water produced by power generation is less likely to block the inside of the porous member, and an increase in pressure loss of oxidant off-gas discharged via the inside of the porous member is able to be inhibited.

Another aspect of the invention also relates to a fuel cell. This fuel cell includes a membrane electrode assembly; a porous member that has a first surface, a second surface, and an end surface portion, the first surface and the second surface being on opposite sides of the porous member, the first surface being arranged on a cathode side of the membrane electrode assembly, the end surface portion being between an end side portion of the first surface and an end side portion of the second surface; a sealing plate arranged along the end side portion of the first surface; and a separator plate arranged on the second surface, wherein the porous member is configured to supply oxidant gas to the membrane electrode assembly through the first surface, and discharge oxidant off-gas to a discharge portion of the fuel cell via the end surface portion; and the sealing plate has a third region that faces the porous member, the separator plate has a fourth region opposite the third region of the sealing plate via the porous member, and a hydrophilicity of the third region is different from a hydrophilicity of the fourth region. According to this structure, water produced by power generation flows along whichever side, i.e., the sealing plate side or the separator plate side, has the higher hydrophilicity, and oxidant off-gas flows on the other side, at the portion of the porous member that is sandwiched between the sealing plate and the separator plate. As a result, the water produced by power generation is less likely to block the flow path, and an increase in pressure loss of oxidant off-gas discharged via this flow path is able to be inhibited.

Another aspect of the invention also relates to a fuel cell. This fuel cell includes a membrane electrode assembly; a porous member that has a first surface, a second surface, and an end surface portion, the first surface and the second surface being on opposite sides of the porous member, the first surface being arranged on a cathode side of the membrane electrode assembly, the end surface portion being between an end side portion of the first surface and an end side portion of the second surface; a sealing plate arranged along the end side portion of the first surface; and a separator plate arranged on the second surface, wherein the porous member is configured to supply oxidant gas to the membrane electrode assembly through the first surface, and discharge oxidant off-gas to a discharge portion of the fuel ceil via the end surface portion; and the sealing plate has a third region that faces the porous member, the third region including a fifth region that is hydrophilically treated, the separator plate has a fourth region opposite the third region of the sealing plate via the porous member, the fourth region including a sixth region that is hydrophilically treated, and an area of the fifth region is different from an area of the sixth region. According to this structure, in the flow path formed by the porous member, mainly water produced by power generation flows along the side where the hydrophilically treated area is larger, of the sealing plate side and the separator plate side, and mainly oxidant off-gas flows on the other side. As a result, the water produced by power generation is less likely to block off the flow path, and an increase in pressure loss of the oxidant off-gas discharged via this flow path is able to be inhibited.

Another aspect of the invention relates to a manufacturing method of a fuel cell. This manufacturing method includes forming an assembly of a porous member and a sealing plate by arranging the sealing plate along an end side portion of a first surface of the porous member; performing hydrophilic treatment on the entire assembly; and arranging a membrane electrode assembly on the first surface of the porous member, and arranging a separator plate on a second surface, the first surface and the second surface being opposite sides of the porous member, while the end side portion of the first surface is facing a discharge portion for discharging oxidant off-gas, on the assembly on which the hydrophilic treatment has been performed. According to this structure, a first region of the first surface of the porous member that faces the sealing plate is masked when the hydrophilic treatment is performed. Therefore, the hydrophilicity of a second region is able to be higher than the hydrophilicity of the first region. Forming the fuel cell using the porous member on which this hydrophilic treatment has been performed enables an increase in pressure loss of oxidant off-gas discharged via the inside of this porous member to be inhibited.

The invention may be realized in a variety of forms. For example, the invention may be realized in the form of a method for discharging produced water in a fuel cell, a porous member used in a fuel cell, and a manufacturing method of such.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7A is a plan view of the porous member with a sealing plate arranged;

FIG. 7B is a sectional view illustrating a cross-section taken along A-A in FIG. 7A;

FIG. 8 is an explanatory view illustrating the state of the inside of an oxidant gas flow path when power is being generated;

DETAILED DESCRIPTION OF EMBODIMENTS

Hereinafter, a first example embodiment of the invention will be described.

Figure 1:
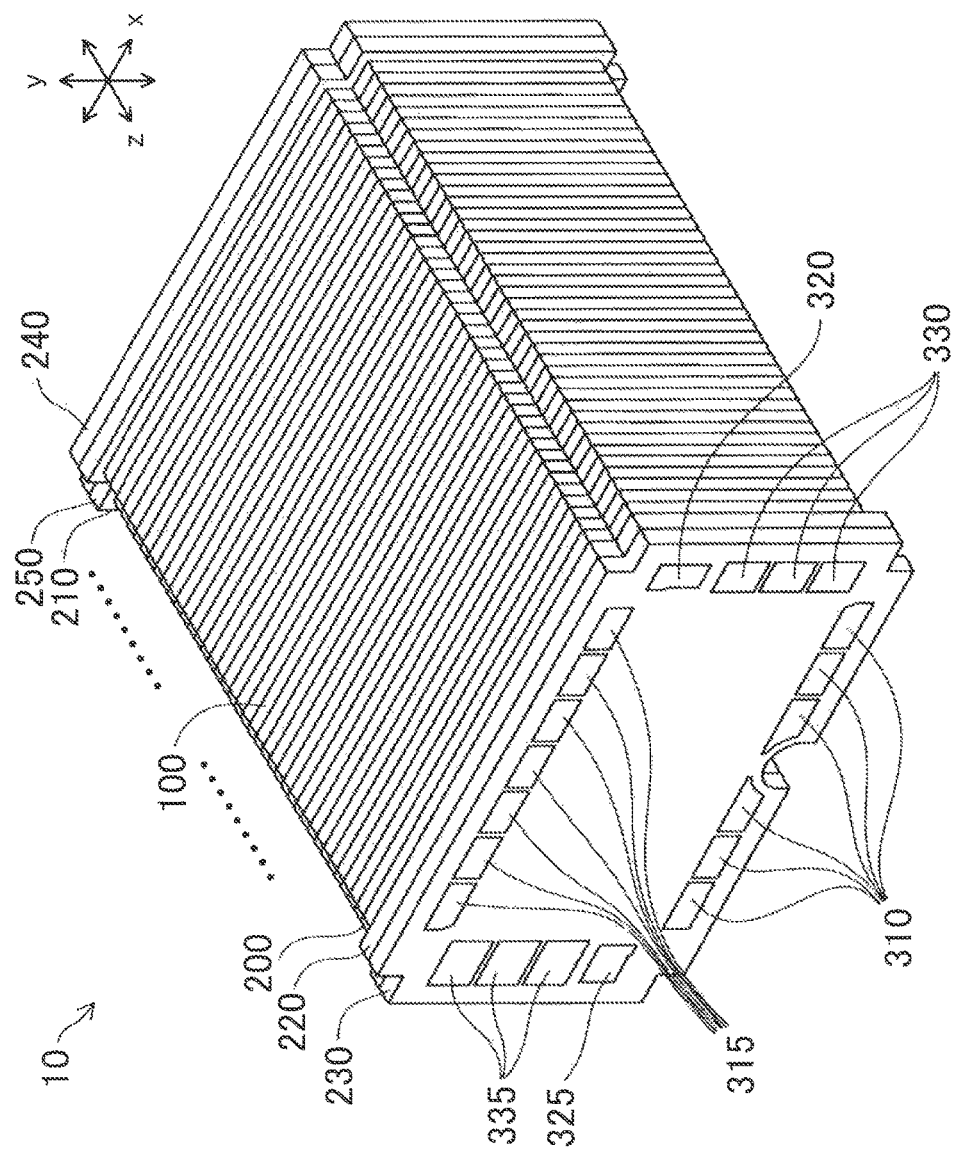
FIG. 1 is a perspective view schematically showing a fuel cell according to one example embodiment of the invention.

FIG. 1 is a perspective view schematically showing the structure of a fuel cell 10 according to the first example embodiment. The fuel cell 10 has a stacked structure in which a plurality of unit ceils 100 of the fuel cell 10 are stacked together in a Z direction (hereinafter also referred to as the "stacking direction"), and sandwiched between a pair of end plates 230 and 240. In the fuel cell 10, an insulating plate 220 and a terminal plate 200 are arranged between the end plate 230 on the front end side and the unit cells 100, and an insulating plate 250 and a terminal plate 210 are arranged between the end plate 240 on the rear end side and the unit cells 100. The terminal plates 200 and 210 are collector plates for collecting power generated by the unit cells 100, and output the power collected from terminals, not shown, to an external device. The unit cells 100, the terminal plates 200 and 210, the insulating plates 220 and 250, and the end plates 230 and 240 each have a plate structure that has a generally rectangular outer shape, and are arranged such that the long side of each extends in an X direction (horizontal direction), and the short side of each extends in a Y direction (vertical or perpendicular direction).

The end plate 230, the insulating plate 220, the terminal plate 200, and the unit cells 100 each have a plurality of openings that serve as supply and discharge holes. These openings are all communicated together to form manifolds 310, 315, 320, 325, 330, and 335. The manifold 310 is used to supply oxidant gas to the unit cells 100. Below, the manifold 310 may also be referred to as an "oxidant gas supply manifold 310". The manifold 315 is used to discharge oxidant off-gas discharged from the unit cells 100. Hereinafter, the manifold 315 may also be referred to as the "oxidant off-gas discharge manifold 315". Below, the manifolds 320, 325, 330, and 335 may also be referred to as a "fuel gas supply manifold 320", a "fuel off-gas discharge manifold 325", a "coolant supply manifold 330", and a "coolant discharge manifold 335", respectively, corresponding to the roles thereof. The fuel cell 10 of this example embodiment supplies reaction gas (i.e., fuel gas and oxidant gas) and coolant from the end plate 230 on the front end side to each of the unit cells 100 via the supply manifolds 310, 320, and 330. Also, the fuel cell 10 discharges off-gas and waste water from the unit cells 100 out of the fuel cell 10 from the end plate 230 on the front end side via the discharge manifolds 315, 325, and 335. The discharge manifolds 315 may also be regarded as the discharge portion of the invention. However, the fuel cell 10 of the example embodiment is not limited to this structure. For example, the fuel cell 10 may also be structured such that a reaction gas and coolant are supplied from the end plate 230 on the front end side, and off-gas and waste water are discharged out of the fuel cell 10 from the end plate 240 on the rear end side.

In this example embodiment, the oxidant gas supply manifold 310 is arranged in the X direction (the long side direction) on an outer edge portion of a lower end of the fuel cell 10, and the oxidant gas discharge manifold 315 is arranged in the X direction in an outer edge portion of an upper end. The fuel gas supply manifold 320 is arranged on an upper end portion in the Y direction (the short side direction) of an outer edge portion on the right end of the fuel cell 10, and the fuel gas discharge manifold 325 is arranged in a lower end portion in the Y direction of an outer edge portion on the left end. The coolant supply manifold 330 is arranged in the Y direction below the fuel gas supply manifold 320, and the coolant discharge manifold 335 is arranged in the Y direction above the fuel gas discharge manifold 325.

Figure 2:
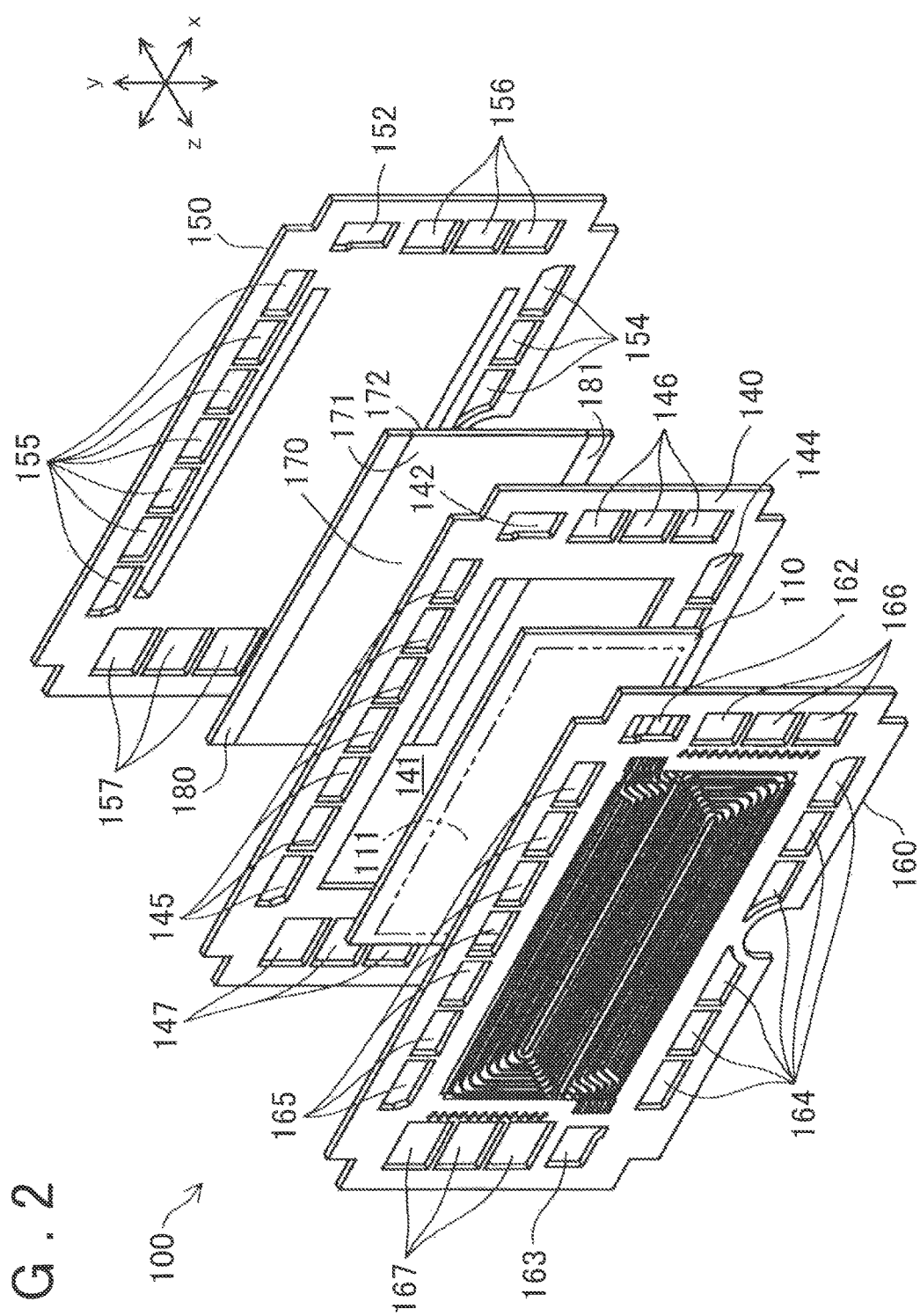
FIG. 2 is an exploded perspective view of a unit cell of the fuel cell.

FIG. 2 is an exploded perspective view of one of the unit cells 100. The unit cell 100 includes a Membrane Electrode & Gas Diffusion Layer Assembly (MEGA) 110, a frame member 140, a cathode-side separator plate 150, an anode-side separator plate 160, and a porous member 170. The MEGA 110 is a power generating body that has a rectangular outer shape. The structure of this MEGA 110 will be described later.

The frame member 140 is arranged along the outer periphery of the MEGA 110, and is made of resin or rubber or the like that has sealing characteristics and insulating properties. The frame member 140 has a rectangular power generating region window 141 in the center that matches the outer shape of the MEGA 110. A stepped portion, not shown, is formed on a peripheral edge of this power generating region window 141. The MEGA 110 fits into the power generating region window by fitting onto this stepped portion. The MEGA 110 that is fitted in the power generating region window 141 overlaps in the Z direction with the frame member 140 at the stepped portion of the frame member 140. The region of the MEGA 110, which is exposed through the power generating region window 141, is a power generating region 111 that receives a supply of fuel gas from the anode-side separator plate 160. The frame member 140 has, as the supply and discharged holes that form the manifolds described above, a fuel gas supply hole 142 and a fuel off-gas discharge hole 143, a plurality of oxidant gas supply holes 144 and oxidant off-gas discharge holes 145, and coolant supply holes 146 and coolant discharge holes 147, provided in the region surrounding the power generating region window 141. The fuel gas supply hole 142 forms a portion of the fuel gas supply manifold 320, and the fuel off gas discharge hole 143 forms a portion of the fuel off-gas discharge manifold 325. The oxidant gas supply holes 144 forms a portion of the oxidant gas supply manifold 310, and the oxidant off-gas discharge holes 145 forms a portion of the oxidant off-gas discharge manifold 315. The coolant supply holes 146 form a portion of the coolant supply manifold 330, and the coolant discharge holes 147 form a portion of the coolant discharge manifold 335. The frame member 140 is arranged between the anode-side separator plate 160 and the cathode-side separator plate 150, and seals the gas How path that faces the MEGA 110, as well as the supply holes and discharge holes, to prevent oxidant gas, fuel gas, and coolant from leaking.

The cathode-side separator plate 150 and the anode-side separator plate 160 are each formed by a rectangular member that has gas blocking and electron conducting properties. The anode-side separator plate 160 and the cathode-side separator 130 are formed by a carbon member of dense carbon in which carbon particles have been compressed to a degree in which the carbon is gas-impermeable or the like, or a metal member of stainless steel or titanium or the like, for example. In this example embodiment, the cathode-side separator plate 150 is made by press forming stainless steel.

The cathode-side separator plate 150 has a generally flat plate-shape, with the center facing the porous member 170 and an outer peripheral portion facing the frame member 140. The cathode-side separator plate 150 includes a fuel gas supply hole 152 and a fuel off-gas discharge hole 153, a plurality of oxidant gas supply holes 154 and oxidant off-gas discharge holes 155, and a plurality of coolant supply holes 156 and coolant discharge holes 157.

The anode-side separator plate 160 is arranged with a center facing the anode side of the MEGA 110 and an outer peripheral portion facing the frame member 140. The anode-side separator plate 160 has a fuel gas flow path in the form of a plurality of groove-like lines on the surface on the side near the MEGA 110, and a coolant flow path in the form of a plurality of groove-like lines on the surface on the opposite side. The anode-side separator plate 160 includes, as supply holes and discharge holes that form the manifolds described above, a fuel gas supply hole 162 and a fuel gas discharge hole 163, a plurality of oxidant gas supply holes 164 and oxidant gas discharge holes 165, and a plurality of coolant supply holes 166 and coolant discharge holes 167.

The porous member 170 is formed by a rectangular porous member that has conductivity and gas diffusivity such as a metal porous body (e.g., expandable metal). The porous member 170 is a member that forms an oxidant gas flow path for supplying oxidant gas to the MEGA 110, and discharging oxidant off-gas to the oxidant off-gas discharge manifold 315. The porous member 170 is positioned between the cathode side of the MEGA 110 and the cathode-side separator plate 150. The porous member 170 includes a first surface 171 that faces the cathode side of the MEGA 110, and a second surface 172 that is formed on the opposite side from the first surface 171 and faces the cathode-side separator plate 150. Sealing plates 180 and 181 are arranged one on each end side portion of the first surface 171 of the porous member 170 in the vertical direction in FIG. 2.

The sealing plates 180 and 181 are formed by gas-impermeable members of metal or the like that have a long rectangular plate shape. The sealing plates 180 and 181 are members for preventing resin or rubber that forms the frame member 140 from flowing into the porous member 170 when manufacturing the frame member 140, and is arranged between the porous member 170 and the frame member 140.

Figure 3:
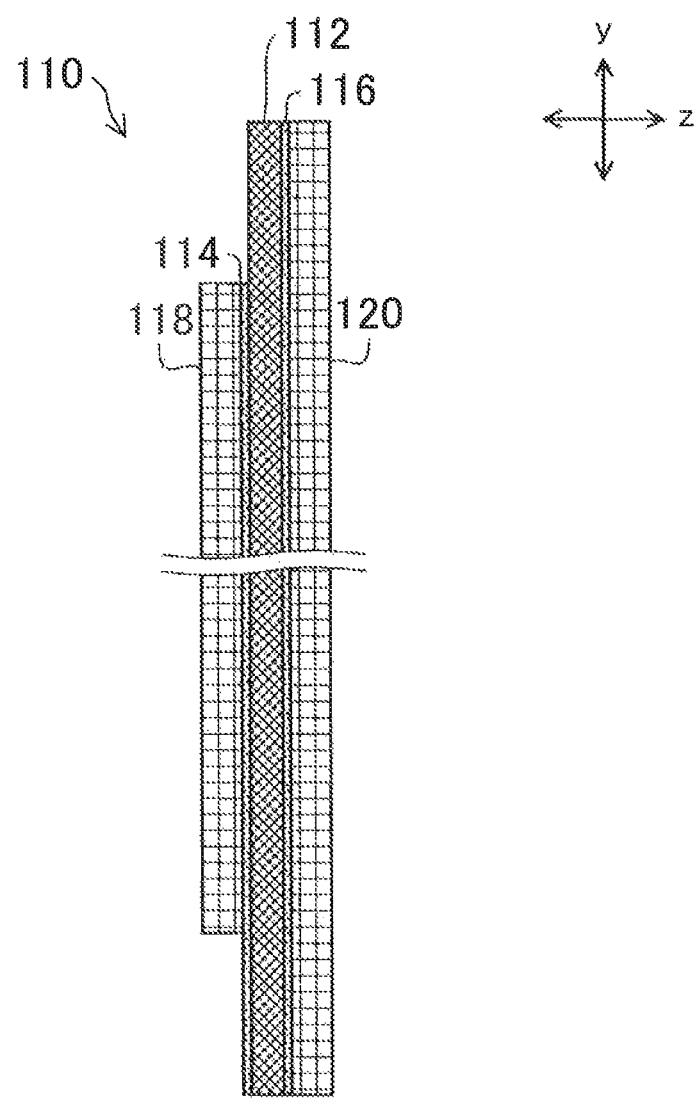
FIG. 3 is an explanatory view of the structure of a membrane electrode and gas diffusion layer assembly.

FIG 3 is an explanatory view of the structure of the membrane electrode and gas diffusion layer assembly 110 (MEGA 110). The MEGA 110 includes an electrolyte membrane 112, a cathode-side catalyst layer 114, an anode-side catalyst layer 136, a cathode-side gas diffusion layer 118, and an anode-side gas diffusion layer 120. The electrolyte membrane 112 is an electrolyte membrane that has proton conductivity, and is made of fluorine electrolyte resin (ion-exchange resin) such as a perfluorocarbon sulfonic acid polymer, for example. The MEGA 110 may be regarded as the membrane electrode assembly of the invention.

The cathode-side catalyst layer 114 and the anode-side catalyst layer 116 include carbon that carries a catalyst (e.g., platinum), and are arranged one on each side of the electrolyte membrane 112. The cathode-side gas diffusion layer 118 is arranged on the cathode-side catalyst layer 114. The anode-side gas diffusion layer 120 is arranged on the anode-side catalyst layer 116. The cathode-side gas diffusion layer 118 and the anode-side gas diffusion layer 120 are made of carbon paper or carbon nonwoven fabric.

Figure 4:
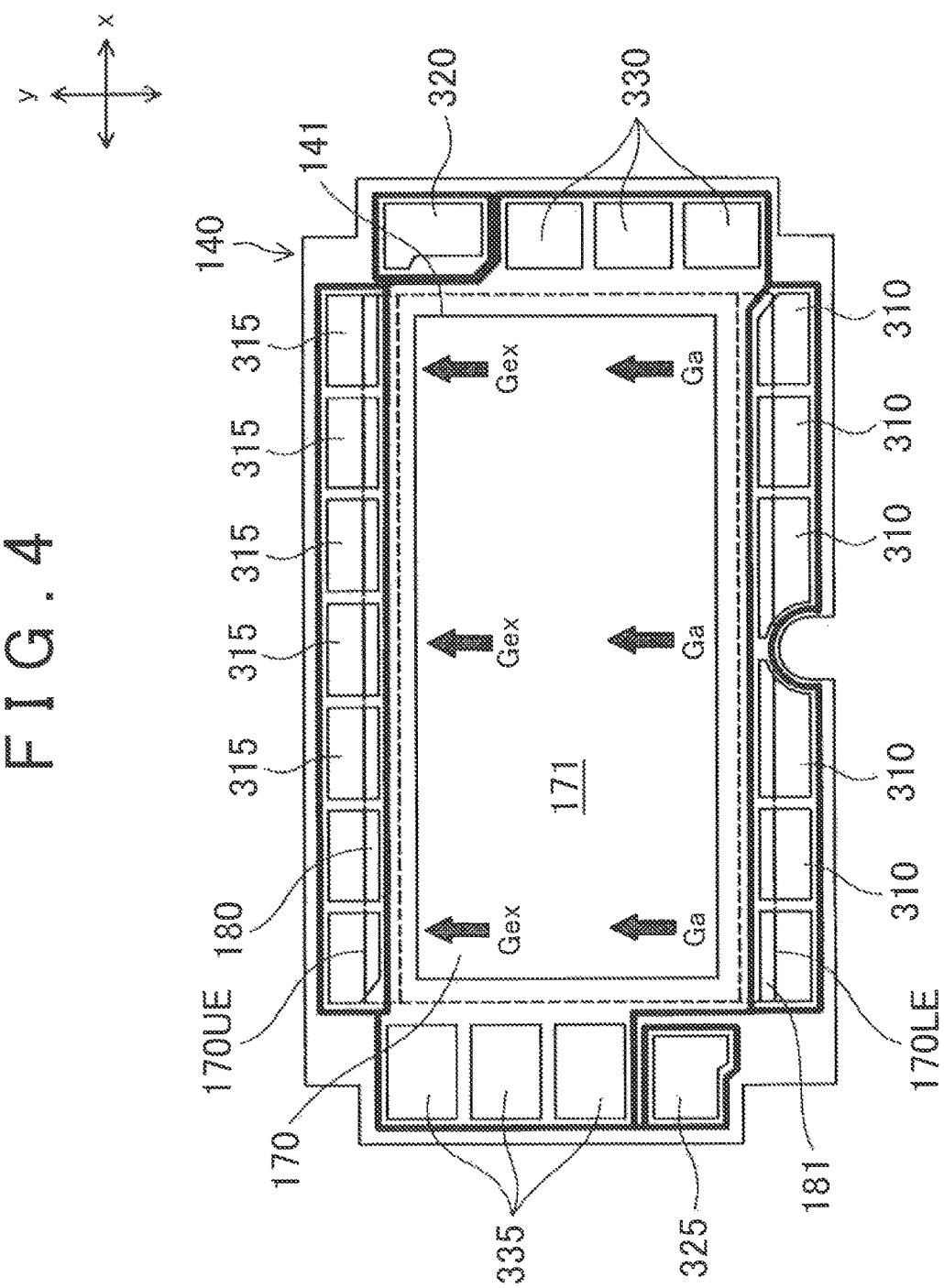
FIG. 4 is an explanatory view of a porous member and a frame member viewed from a Z direction.

FIG. 4 is an explanatory view of the frame member 140 and the porous member 170 on which the sealing plates 180 and 181 are arranged, viewed from the Z direction. In FIG. 4, the MEGA 110 (FIG. 2) is shown not attached to the power generating region window 141 of the frame member 140. In addition, the portions of the porous member 170 and the sealing plates 180 and 181 that are positioned on the back surface side of the frame member 140 are indicated by a broken line. The sealing plate 180 is arranged on an end portion 170UE on one side of the porous member 170. The porous member 170 is arranged such that the end portion 170UE on the upper side follows the end side on the lower side of the oxidant off-gas discharge manifold 315. Also, the porous member 170 is arranged such that the end portion 170LE follows the end side on the upper side of the oxidant gas supply manifold 310. The sealing plate 381 is arranged on an end portion 170LE on a lower side of the porous member 170. The porous member 170 channels oxidant gas Ga supplied from the oxidant gas supply manifold 310 in the surface direction (the XY plane direction) of the porous member 170 from the end portion 170LE on the lower side where the sealing plate 181 is arranged, and supplies it (the oxidant gas Ga) to the MEGA 110 via the first surface 171. Also, the porous member 170 discharges oxidant off-gas Gex discharged from the MEGA 110 to the oxidant off-gas discharge manifold 315 via the end portion 170UE on the upper side where the sealing plate 180 is arranged.

Figure 5:
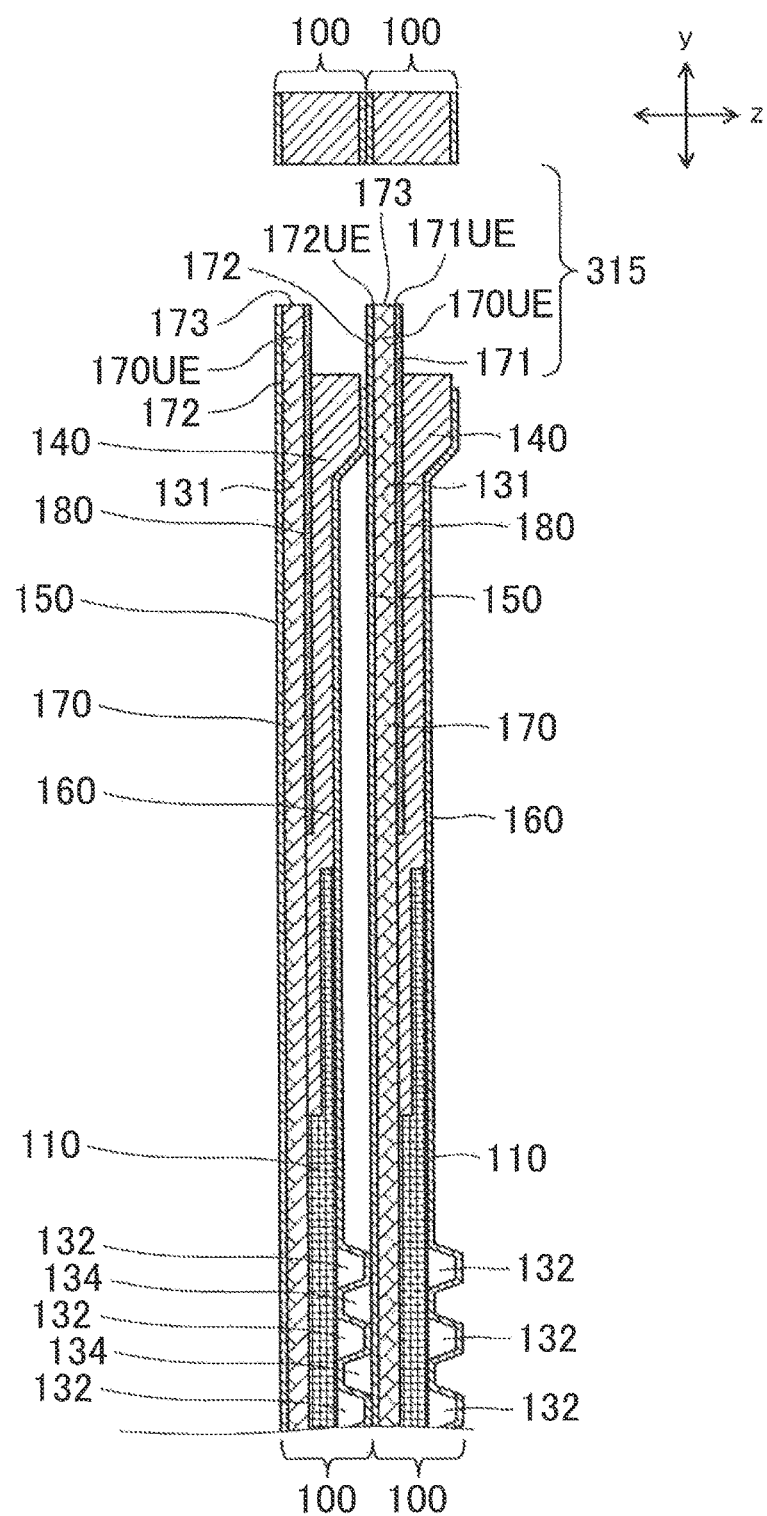
FIG. 5 is a sectional view of an area near an oxidant off-gas manifold of the unit cell.

FIG. 5 is a sectional view of the area around the oxidant off-gas discharge manifold 315 of the unit cells 100. In each unit ceil 100, an oxidant gas flow path 131 is formed by the porous member 170 between the cathode-side separator plate 150 and the sealing plate 180, and between the cathode-side separator plate 150 and the frame member 140, One surface of the cathode-side separator plate 150 faces the porous member 170, and the other surface of the cathode-side separator plate 150 faces the anode-side separator plate 160 of another adjacent unit cell 100. A coolant flow path 134 is formed between the cathode-side separator plate 150 of one unit cell 100 and the adjacent anode-side separator plate 160 of another unit cell 100. Meanwhile, a fuel gas flow path 132 is formed between the anode-side separator plate 160 and the MEGA 110.

An end side portion 171UE on an upper side of the first surface 171, an end side portion 172UE on an upper side of the second surface 172, and an end surface portion 173 positioned between the end side portion 171UE and the end side portion 173UE, are formed on the end portion 170UE on the upper side of the porous member 170. The end surface portion 173 laces the oxidant off-gas discharge manifold 315. The end portion 170UE on the upper side of the porous member 170 protrudes into the oxidant off-gas discharge manifold 315, together with the end portions on the upper side of the sealing plate 180 and the cathode-side separator plate 150. The oxidant off-gas discharged from the MEGA 110 flows inside the porous member 170 and is discharged to the oxidant off-gas discharge manifold 315 via the end surface portion 173.

The sealing plate 180 is arranged along the end side portion 171UE of the first surface 171 of the porous member 170, and faces the frame member 140. Similarly, the sealing plate 181 arranged on the end portion 170LE (FIG. 4) on the lower side of the porous member 170 is arranged along an end side portion, not shown, on the lower side of the first surface 171 of the porous member 170, and faces the frame member 140.

Figure 6:
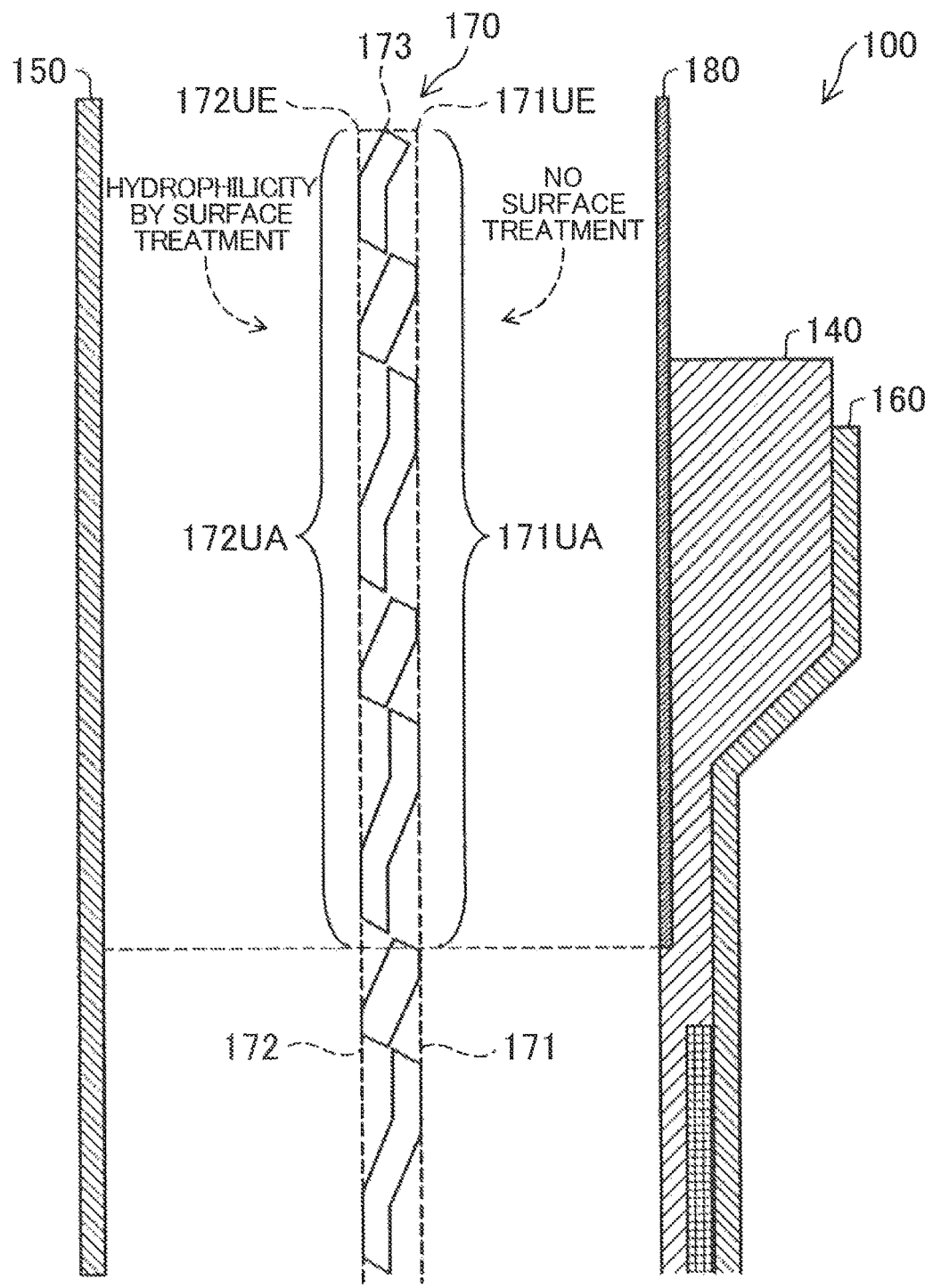
FIG. 6 is an explanatory view illustrating the structure of the porous member.

FIG. 6 is an explanatory view illustrating the structure of the porous member 170. In FIG. 6, the sealing plate 180, the cathode-side separator plate 150, and the frame member 140 are shown separated from the porous member 170 for the purpose of illustration. In the description below, the region of the first surface 171 of the porous member 170 that faces the sealing plate 180 will also be referred to as a "first region 171UA", and the region of the second surface 172 that is on the opposite side from the first region 171UA of the first surface 171 will also be referred to as a "second region 172UA". The unit cell 100 is structured such that the first region 173 UA of the first surface 171 and the second region 172UA of the second surface 172 have different hydrophilicities. In this example embodiment, the second region 172UA of the second surface 172 has a higher hydrophilicity than the first region 171UA of the first surface 171. In this specification, the hydrophilicity of the region refers to the average value of hydrophilicity in a region. Also, a high hydrophilicity means that the contact angle is small. At this time, of the contact angle of two compared regions, one or both contact angles may be exceeding 90°. That is, the term "hydrophilicity" in the broad sense used in this specification also includes a case in which the contact angle exceeds 90°. "Hydrophilicity" in a narrow sense means that the contact angle is less than 90°.

FIG. 7 is an explanatory view illustrating one example of a method for making the hydrophilicity of the second region 172UA higher than the hydrophilicity of the first region 171UA of the porous member 170. FIG. 7A is a plan view of the porous member 170 with the sealing plates 180 and 181 provided, and FIG. 7B is a sectional view of an example of a cross-section taken along line A-A of FIG. 7A. First, as shown in FIG. 7A, the porous member 170 and the sealing plate 180 are prepared, and the sealing plate 180 is arranged along the end side portion 171UE on the upper side of the first surface 171 of the porous member 170. In this example embodiment, the sealing plate 181 is also arranged on the end side portion 171LE on the lower side. Then, as shown in FIG. 7B, hydrophilic treatment is performed on the entire porous member 170 with the sealing plate 180 provided. Some examples of hydrophilic treatment are ultraviolet irradiation treatment, honing treatment, plasma treatment, physical surface roughening treatment, application of a hydrophilic agent, and treatment for forming small protrusions, but the method of hydrophilic treatment is not limited to these. In the porous member 170, hydrophilic treatment is not performed on the first region 171UA of the first surface 171 that is masked by the sealing plate 180, but is performed on the second region 172UA of the second surface 172. Therefore, the hydrophilicity of the second region 172UA is able to be made higher than the hydrophilicity of the first region 171UA of the porous member 170.

FIG. 8 is an explanatory view illustrating the state inside the oxidant gas flow path 131 when power is being generated. The unit cell 100 in this example embodiment is structured such that the second surface 172 of the porous member 170 has a higher hydrophilicity than the first surface 171, at least at a portion where the oxidant gas flow path 131 is sandwiched between the sealing plate ISO and the cathode-side separator plate 150. Therefore, at this portion of the oxidant gas flow path 131, water Wa produced by power generation is able to flow along the second surface 172 of the porous member 170. As a result, the oxidant off-gas Gex is able to be channeled along the first surface 171 of the porous member 170, and discharged to the oxidant off-gas discharge manifold 315.

Figure 9:
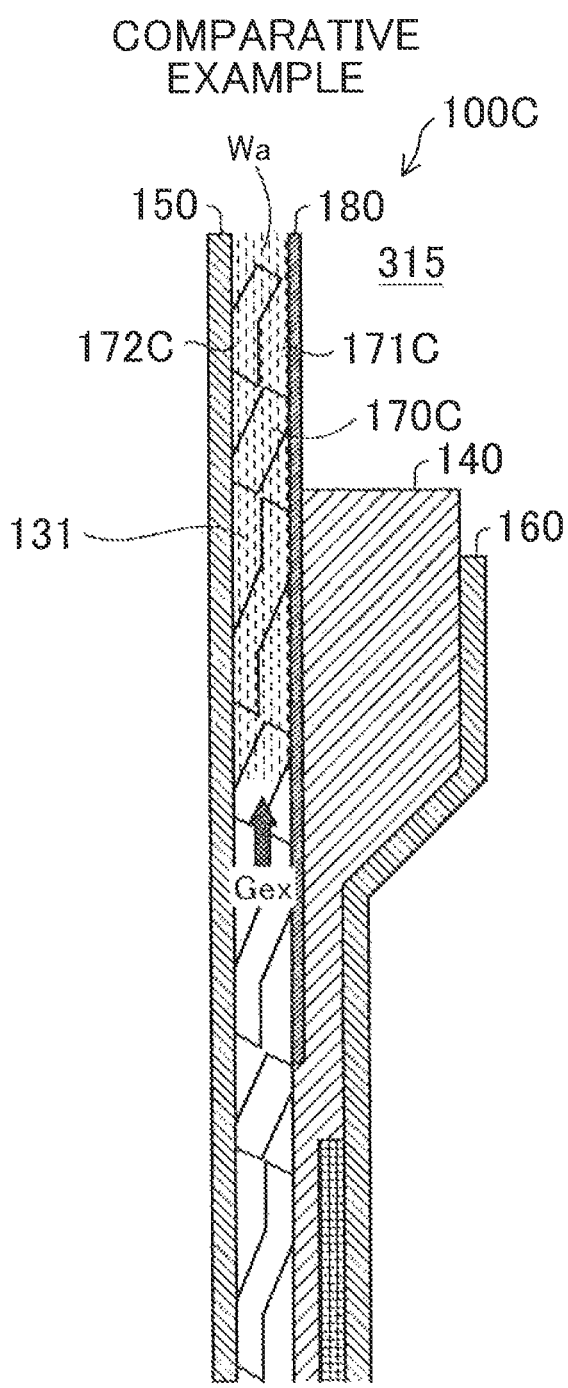
FIG. 9 is an explanatory view illustrating the state of the inside of a unit cell of a fuel cell according to a comparative example.

FIG. 9 is an explanatory view illustrating the state inside a unit cell 100C of a comparative example when power is being generated. The unit ceil 100C of the comparative example differs from the unit cell 100 in the example embodiment only in terms of the structure of a porous member 170C. Hydrophilic treatment is not performed on the porous member 170C in the comparative example, so the hydrophilicities of a first, surface 171C and a second surface 172C are substantially the same. With the unit cell 100C of the comparative example, water Wa flows along both of the first surface 171C side and the second surface 172C side, of the porous member 170C, at at least the portion sandwiched between the sealing plate 180 and the cathode-side separator plate 150. When the water Wa flows along both sides of the porous member 170C, the water Wa may block off the oxidant gas flow path 131, as shown in FIG. 9. When the oxidant gas flow path 131 is blocked off by the water Wa, pressure loss when the oxidant off-gas Gex is discharged to the oxidant off-gas discharge manifold 315 increases, so power generating performance decreases.

Figure 10:
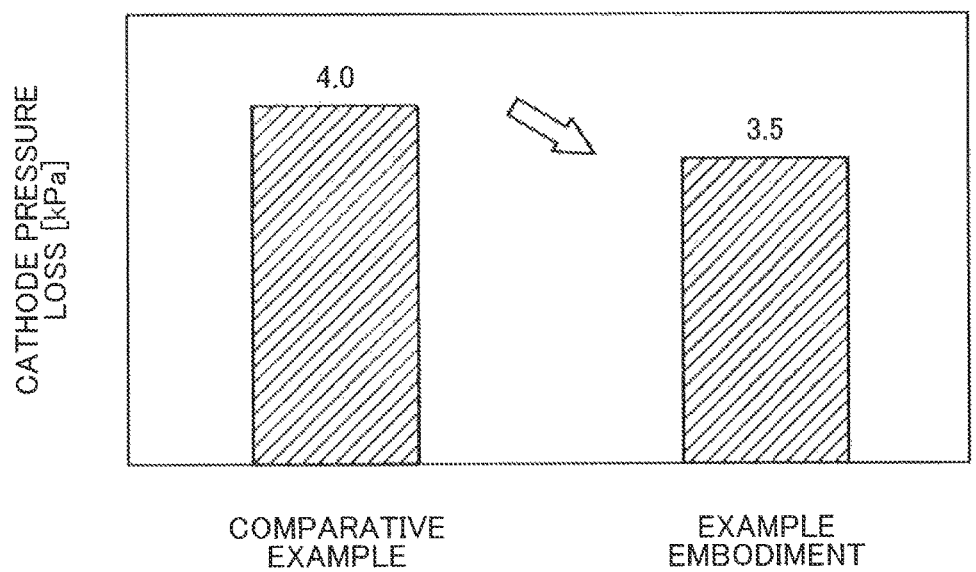
FIG. 10 is a view comparing pressure loss of oxidant off-gas in the example embodiment and the comparative example.

FIG. 10 is a view comparing pressure loss of oxidant off-gas in the unit cell 100 of the example embodiment and pressure loss of oxidant off-gas in the unit cell 100C of the comparative example. The pressure losses of the unit cells were compared under conditions with a stoichiometric ratio of 2.0, a current density of 1.5 A/cm², and a cathode input gas temperature of 20° C. The results showed a pressure loss with the unit cell 100 of the example embodiment of 3.5 kPa, compared to a pressure loss with the unit cell 100C of the comparative example of 4.0 kPa. From this, it is evident that the pressure loss of the oxidant off-gas Gex in the oxidant gas flow path 131 is reduced by the structure of the example embodiment.

With the fuel cell 10 according to the first example embodiment described above, the pressure loss of the oxidant off-gas Gex discharged via the inside of the porous member 170 is able to be inhibited from increasing. More specifically, at the portion of the porous member 170 that is sandwiched between the sealing plate 180 and the cathode-side separator plate 150, the water Wa produced by power generation is able to flow along either the first surface 171 side or the second surface 172 side, whichever has a relatively higher hydrophilicity, and the oxidant off-gas Gex is able to flow along the other side. As a result, the water Wa produced by power generation is less likely to block off the inside of the porous member 170, such that an increase in pressure loss of the oxidant off-gas Gex discharged via the inside of the porous member 170, and a decrease in power generation performance resulting from such an increase, are able to be inhibited.

Next, a second example embodiment of the invention will be described.

Figure 11:
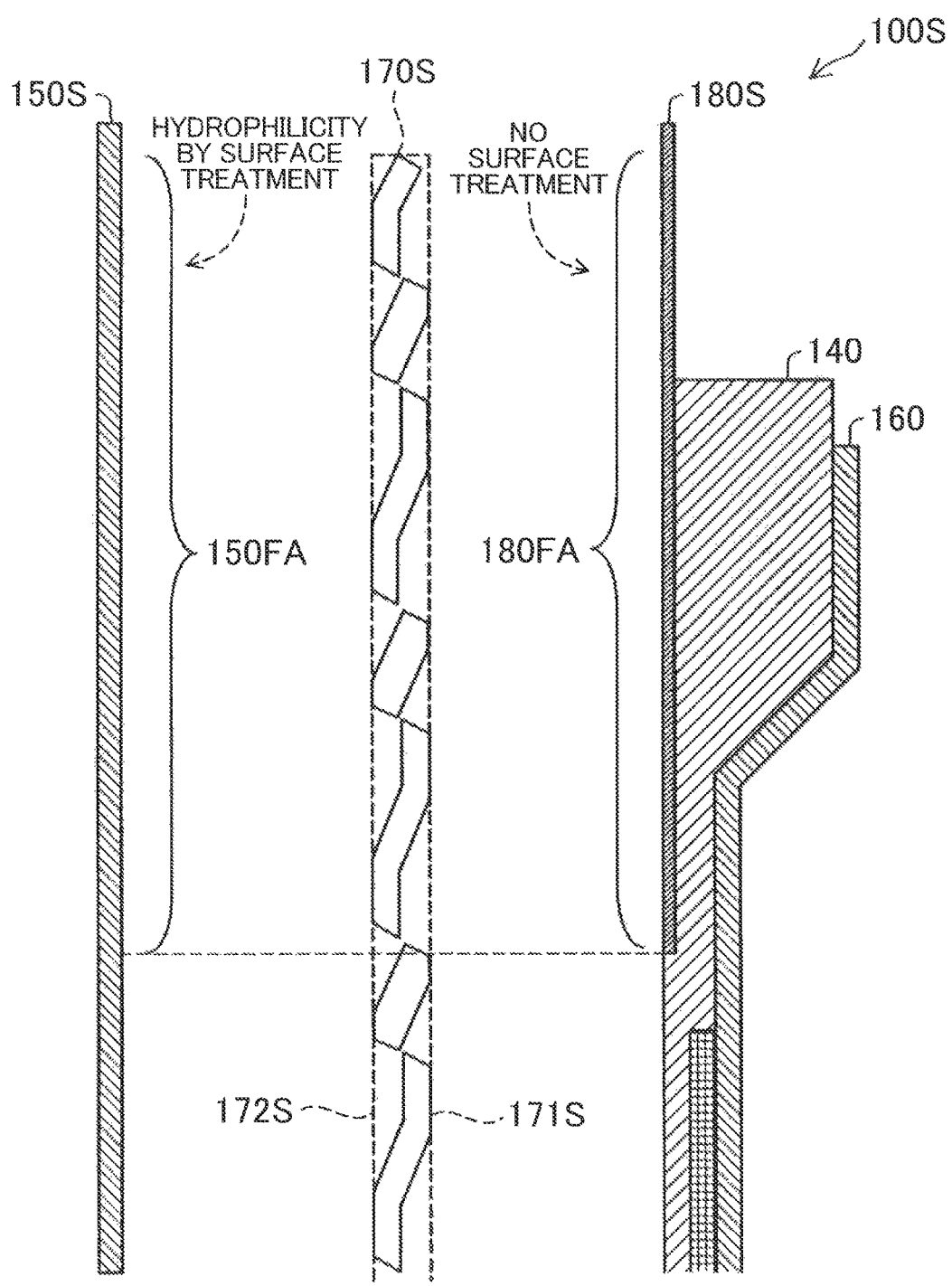
FIG. 11 is a view illustrating a unit cell of a fuel cell according to a second example embodiment of the invention.

FIG. 11 is a view illustrating a unit cell 100S of a fuel cell according to the second example embodiment. In FIG 11, a sealing plate 180S, a cathode-side separator plate 150S, and the frame member 140 are shown separated from a porous member 170S, for the purpose of illustration. In the unit cell 100S of the second example embodiment, the member on which performing hydrophilic treatment is performed is different than it is in the unit cell 100 of the first example embodiment. In the description below, the region of the sealing plate 180S that faces the porous member 170S may also be referred to as the "third region 180FA", and the region of the cathode-side separator plate 150S on the opposite side of the porous member 170S from the third region 180FA of the sealing plate 180S may also be referred to as the "fourth region 150FA".

The unit cell 100S of the second example embodiment, is structured such that the third region 180FA of the sealing plate 180S and the fourth region 150FA of the cathode-side separator plate 150S have different hydrophilicities. In this example embodiment, the fourth region 150FA of the cathode-side separator plate 150S has a higher hydrophilicity than the third region 180FA of the sealing plate 180S. Hydrophilic treatment is not performed on the porous member 170S, so the hydrophilicity of a first surface 171S and a second surface 172S are approximately the same.

With this structure as well, an increase in pressure loss of the oxidant off-gas Gex discharged via the inside of the porous member 170S is able to be inhibited. More specifically, in the oxidant gas flow path, the water produced by power generation is able to flow along one side, i.e., the sealing plate 180S side or the cathode-side separator plate 150S side, whichever has a relatively higher hydrophilicity, and the oxidant off-gas Gex is able to flow along the other side. As a result, the water Wa produced by power generation is less likely to block off the flow path, such that an increase in pressure loss of the oxidant off-gas Gex discharged via this flow path, and a decrease in power generation performance resulting from such an increase, are able to be inhibited.

The porous member 170S is structured such that of the first surface 171S and the second surface 172S, the surface facing the surface with the relatively high hydrophilicity has a higher hydrophilicity than the other surface. More specifically, if the fourth region 150FA of the cathode-side separator plate 150S has a higher hydrophilicity than the third region 180FA of the sealing plate 180S, then the second surface 172S of the porous member 170S may have a higher hydrophilicity than the first surface 171S. In this case, the water Wa produced by power generation more stably flows on one side, i.e., between the cathode-side separator plate 150S, and the second surface 172S of the porous member 170S. As a result, the water Wa is less likely to block the inside of the porous member 170S, which is more preferable.

Figure 12:
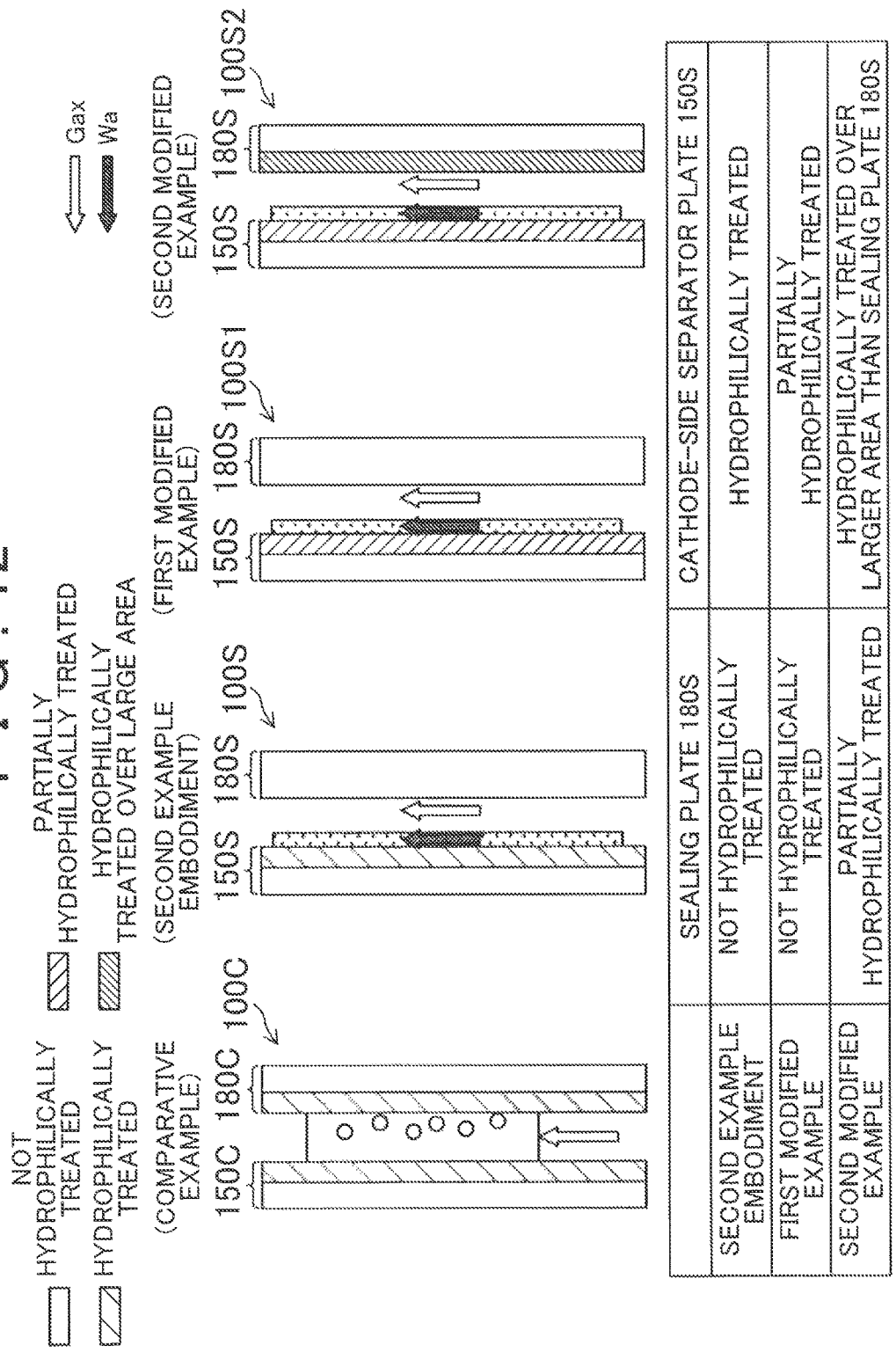
FIG 12 is a view illustrating unit cells of fuel cells according to modified examples of the second example embodiment.

FIG. 12 is a view of unit ceils 100S1 and 100S2 of fuel cells according to modified examples of the second example embodiment. In FIG. 12, only the tip end portions of the sealing plate 180S and the cathode-side separator plate 150S are shown. The porous member 170, the frame member 140, and the anode-side separator plate 160 are omitted. In addition to the unit cell 100C of the comparative example and the unit cell 100S of the second example embodiment described above, a unit cell 100S1 of a fuel cell according to a first modified example of the second example embodiment, and a unit cell 100S2 of a fuel cell according to a second modified example of the second example embodiment, are also shown in FIG. 12.

In the unit cell 100S1 of the first modified example, hydrophilic treatment is performed on part of the fourth region 150FA of the cathode-side separator plate 150S. Therefore, the fourth region 150FA of the cathode-side separator plate 150S includes two regions, i.e., a region that has been hydrophilically treated, and a region that has not been hydrophilically treated. The third region 180FA of the sealing plate 180S is not hydrophilically treated.

In the unit cell 100S2 of the second modified example, hydrophilic treatment is performed on part of the third region 180FA of the sealing plate 180S, and on part of the fourth region 150FA of the cathode-side separator plate 150S. Therefore, both the third region 180FA and the fourth region 150FA include two regions, i.e., a region that has been hydrophilically treated, and a region that has not been hydrophilically treated. The area of the fourth region 150FA that has been hydrophilically treated is wider than the area of the third region 180FA that has been hydrophilically treated. The hydrophilicities of the regions are approximately the same. With the unit cells 100S1 and 100S2 of the first and second modified examples, the porous member is not hydrophilically treated, so the hydrophilicity of both surfaces is approximately the same. Here, the region of the third region 180FA of the sealing plate 180S that is hydrophilically treated may also be referred to as a "fifth region 180FAP". Also, the region of the fourth region 150FA of the cathode-side separator plate 150S that, is hydrophilically treated may also be referred to as a "sixth region 150FAP". The region that is not hydrophilically treated may also be referred to as an "untreated region NP".

Figure 13:
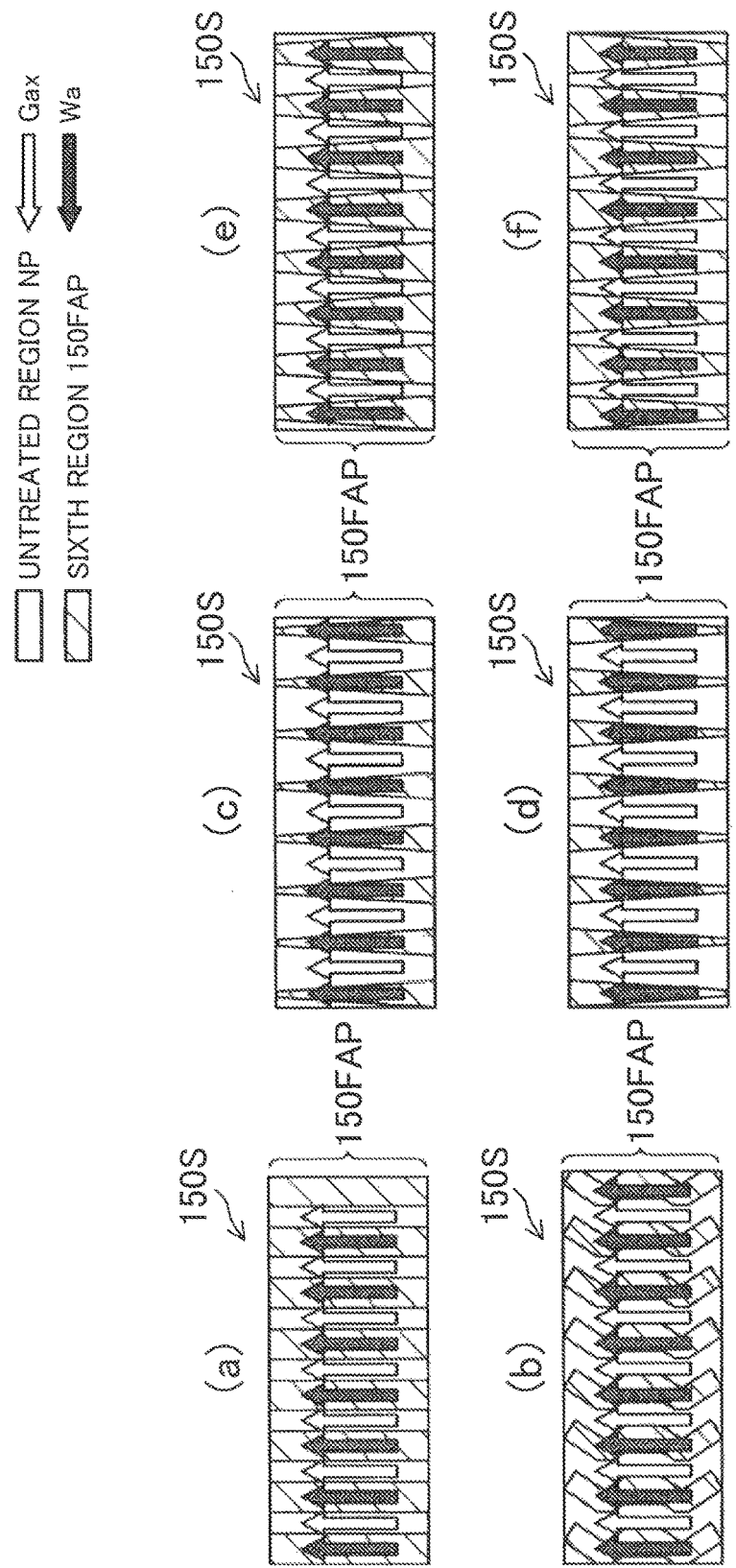
FIG. 13 is a plan view illustrating a sixth region of a cathode-side separator plate.

FIG. 13 is a plan view of illustrating the sixth region 150FAP and the untreated region NP of the cathode-side separator plate 150S in the first modified example. In the modified examples (a) to (f) in FIG. 13, the fourth region 150FA of the cathode-side separator plate 150S is shown, and the upper side of the paper on which FIG. 13 is drawn faces the oxidant off-gas discharge manifold 315. As illustrated by modified example (a) in FIG. 13, the sixth region 150FAP may be formed by a plurality of rectangular-shaped regions, and these regions may be arranged alternately with the untreated regions NP that have a rectangular shape. The sixth region 150FAP preferably contacts the end side on the upper side of the cathode-side separator plate 150S. In this case, the water Wa that flows along the sixth region 150FAP is able to be easily discharged to the oxidant, off-gas discharge manifold 315. Also, as illustrated by modified example (b) in FIG. 13, the sixth region 150FAP may be formed by a plurality of curved regions. Also, as illustrated by modified example (c) in FIG. 13, the sixth region 150FAP may be formed by a plurality of generally triangular regions in which the width becomes narrower toward the oxidant off-gas discharge manifold 315. Also, conversely, as illustrated by modified example (d) in FIG. 13, the width of each of the plurality of regions that form the sixth region 350FAP may become wider toward the oxidant off-gas discharge manifold 315. Also, the ratio of the width of each of the plurality of regions that form the sixth region 150FAP to the width of each of the untreated regions NP may be set arbitrarily. For example, as illustrated by modified examples (e) and (f) in FIG. 13, the width of each of the plurality of regions that form the sixth region 150FAP may be relatively wider than that in modified examples (c) and (d) in FIG. 13. Modified examples (a) to (f) in FIG. 13 illustrate shapes of the sixth region 150FAP, but the shape of the sixth region 150FAP is not limited to these.

The unit cell 100S1 and 100S2 according to the first and second modified examples are structured such that an area AS of the fifth region 180FAP that is hydrophilically treated, of the third region 180FA of the sealing plate 180S, is different from an area AC of the sixth region 150FAP that is hydrophilically treated, of the fourth region 150FA of the cathode-side separator plate 150S. Here, as one example of this, the area AC of the sixth region 150FAP of the cathode-side separator plate 150S is formed larger than the area AS of the fifth region 180FAP of the sealing plate 180S.

For example, with the unit cell 100S1 of the first modified example, the fourth region 150FA of the cathode-side separator plate 150S is partially hydrophilically treated, while the third region 180FA of the sealing plate 180S is not hydrophilically treated. Therefore, the area AS of the fifth region 180FAP of the sealing plate 180S is 0, while the area AC of the sixth region 150FAP of the cathode-side separator plate 150S is greater than 0. Therefore, the area AC is greater than the area AS. With the unit cell 100S2 of the second modified example, the hydrophilically treated area of the fourth region 150FA is larger than the hydrophilically treated area of the third region 180FA, so the area AC is greater than the area AS.

With the structures described above as well, an increase in pressure loss of the oxidant off-gas Gex discharged via the How path formed between the cathode-side separator plate 150S and the sealing plate 180S is able to be inhibited. More specifically, in the oxidant gas flow path, mainly the water Wa is able to flow along one side where the area of the hydrophilically treated region is large, of the sealing plate 180S and the cathode-side separator plate 150S, and mainly the oxidant off-gas Gex is able to flow on the other side. As a result, the water Wa produced by power generation is less likely to block off the flow path, and an increase in pressure loss of the oxidant off-gas Gex discharged via this flow path, as well as a decrease in power generation performance that results from this increase, are able to be inhibited.

The invention is not limited to the example embodiments and modified examples thereof described above, but may be carried out in any of a variety of modes without departing from the scope thereof. For example, modifications such as those described below are also possible.

Hereinafter, one modified example of the example embodiment of the invention will be described.

Figure 14:
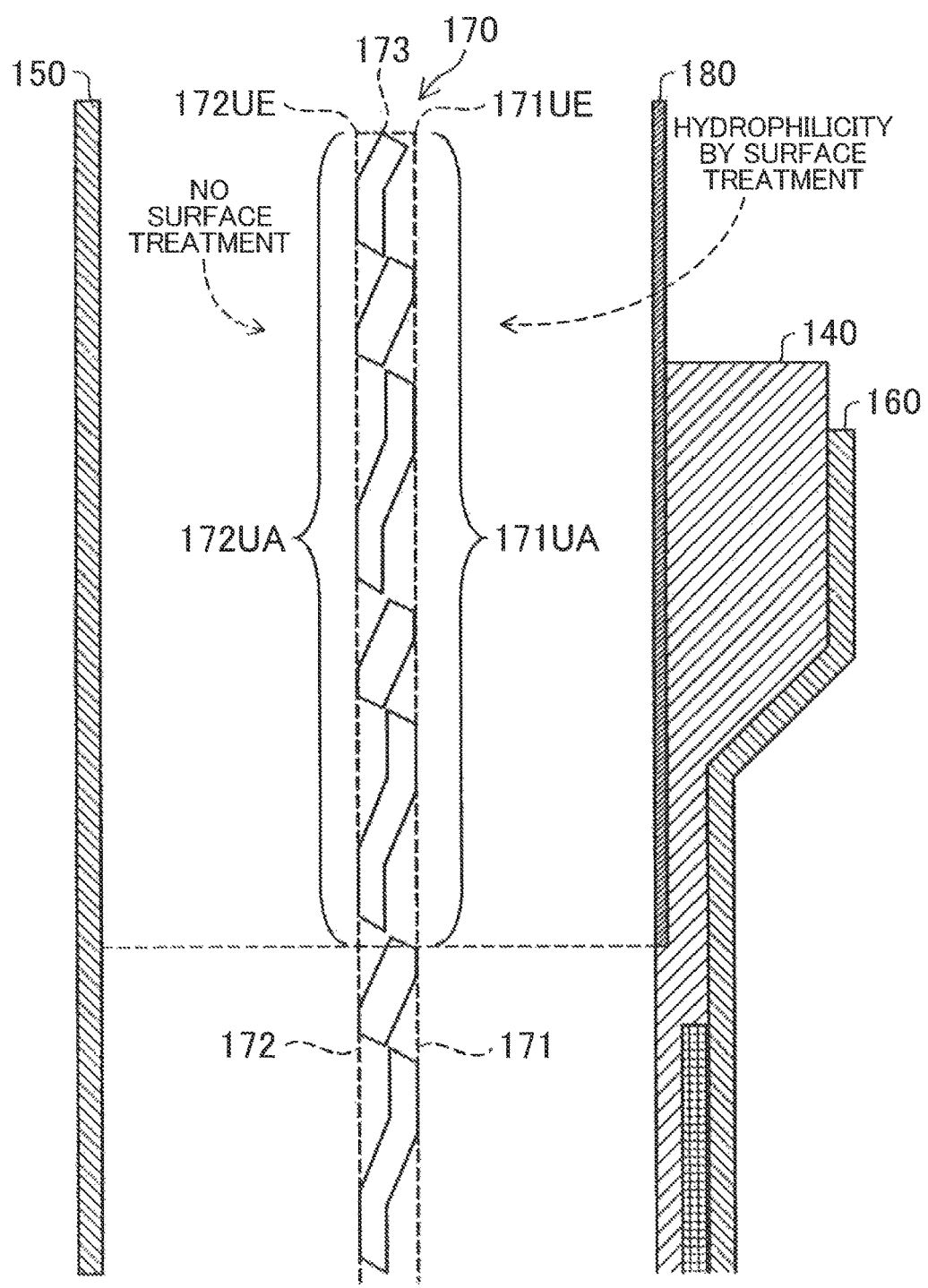
FIG. 14 is a view illustrating a unit cell of a fuel cell according to a modified example.

FIG. 14 is a view illustrating a unit ceil of a fuel cell according to the modified example. In the first example embodiment, the second region 172UA of the second surface 172 of the porous member 170 has a higher hydrophilicity than the first region 171UA of the first surface 171. However, hydrophilic treatment may also be applied to the first region 171UA of the first surface 171, such that the first region 171UA of the first surface 171 has a higher hydrophilicity than the second region 172UA of the second surface 172. In this case as well, the water Wa is able to flow on the side of the first surface 171 where the hydrophilicity is relatively high, and the oxidant off-gas Gex is able to flow on the side with the second surface 172.

In the first example embodiment, hydrophilic treatment is performed on only one of the first region 171UA and the second region 172UA of the porous member 170, but hydrophilicity treatment may also be applied to both regions, with the degree of hydrophilicity differing between these regions. In this case as well, of these regions 171UA and 172UA, the water Wa is able to be made to flow on the side where the hydrophilicity is relatively high, and the oxidant off-gas Gex is able to be made to flow on the other side.

Also, in the second example embodiment, with the third region 180FA of the sealing plate 180S and the fourth region 150FA of the cathode-side separator plate 150S as well, hydrophilic treatment may be applied to both, with the degree of hydrophilicity differing between these regions.

In the first example embodiment, hydrophilicity is applied to one of the first region 171UA and the second region 172UA of the porous member 170, but water-repellent treatment may also be applied to either one. A difference may be provided in the degree of hydrophilicity of these regions 171UA and 172UA, i.e., in the degree of the contact angle. Examples of the water-repellent treatment include applying resin, coating, and mirror finishing and the like.

Also, in the second example embodiment, the difference in the degree of hydrophilicity between the third region 180FA of the sealing plate 180S and the fourth region 150FA of the cathode-side separator plate 150S may be created by water-repellent treatment. Also, in the first and second modified examples of the second example embodiment, water-repellent treatment may be partially performed on the third region 180FA of the sealing plate 180S and the fourth region 150FA of the cathode-side separator plate 150S, and the regions where the water-repellent treatment is not performed may be the fifth region 180FAP and the sixth region 150FAP.

In the first example embodiment, hydrophilic treatment is applied to one entire region, from among the first region 171UA and the second region 172UA of the porous member 170, but hydrophilic treatment may also be partially performed (i.e., performed at certain parts). In this case as well, the water Wa is able to be made to flow via the portion that is not hydrophilically treated, so the oxidant off-gas Gex is able to be made to flow on the other side. When hydrophilic treatment is partially performed, the region that is hydrophilically treated is preferably contacting the end side portion 171UE or the end side portion 172UE. More preferably, the entire region is hydrophilically treated. Hydrophilically treating the entire region enables the water Wa to stably flow on one side.

The structure of the unit cell 100 of the first example embodiment and the structure of the unit cell 100S of the second example embodiment may also be combined as appropriate. For example, the porous member 170 of the first example embodiment may be used in the unit cell 100S of the second example embodiment. Also, the first region 171UA and the second region 172UA of the porous member 170 may be partially hydrophilically treated like the third region 180FA of the sealing plate 180S and the fourth region 150FA of the cathode-side separator plate 150S in the second modified of the second example embodiment.

What is claimed is:

1. A fuel cell comprising:
a membrane electrode assembly;
a porous member that has a first surface, a second surface, and an end surface portion, the first surface and the second surface being on opposite sides of the porous member, the first surface being arranged on a cathode side of the membrane electrode assembly, the end surface portion being between an end side portion of the first surface and an end side portion of the second surface;
a sealing plate arranged along the end side portion of the first surface; and
a cathode-side separator plate arranged on the second surface, wherein
the porous member is configured to supply oxidant gas to the membrane electrode assembly through the first surface, and discharge oxidant off-gas to an oxidant off-gas discharge manifold of the fuel cell via the end surface portion;
the sealing plate has a third region that faces the porous member, the cathode-side separator plate has a fourth region opposite the third region of the sealing plate via the porous member, and a hydrophilicity of the fourth region is higher than a hydrophilicity of the third region;
the cathode-side separator plate is flat-shaped;
the fourth region of the cathode-side separator plate has a hydrophilically-treated region that is hydrophilically treated;
the hydrophilically-treated region is on an opposite side of the third region of the sealing plate; and
the cathode-side separator plate has a non-hydrophilically-treated region that is not hydrophilically treated.

2. The fuel cell of claim 1, wherein:
a starting point of the fourth region of the cathode-side separator plate is the same as a starting point of the third region of the sealing plate in a flow direction of the oxidant gas; and
an end point of the fourth region of the cathode-side separator plate is the same as an end point of the third region of the sealing plate in the flow direction of the oxidant gas.

3. The fuel cell of claim 1, wherein the porous member is not hydrophilically treated.

4. The fuel cell of claim 1, wherein the first surface and the second surface of the porous member are hydrophilically treated.

5. The fuel cell of claim 1:
a first region of the first surface of the porous member is not hydrophilically treated; and
a second region of the second surface of the porous member is hydrophilically treated.

6. A fuel cell comprising:
a membrane electrode assembly;
a porous member that has a first surface, a second surface, and an end surface portion, the first surface and the second surface being on opposite sides of the porous member, the first surface being arranged on a cathode side of the membrane electrode assembly, the end surface portion being between an end side portion of the first surface and an end side portion of the second surface;
a sealing plate arranged along the end side portion of the first surface; and
a cathode-side separator plate arranged on the second surface, wherein
the porous member is configured to supply oxidant gas to the membrane electrode assembly through the first surface, and discharge oxidant off-gas to an oxidant off-gas discharge manifold of the fuel cell via the end surface portion;
the sealing plate has a third region that faces the porous member, the third region including a fifth region that is hydrophilically treated, the cathode-side separator plate has a fourth region opposite the third region of the sealing plate via the porous member, the fourth region including a sixth region that is hydrophilically treated, and an area of the sixth region is larger than an area of the fifth region;
the porous member is not hydrophilically treated;
the cathode-side separator plate is flat-shaped;
the cathode-side separator plate has a non-hydrophilically-treated region that is not hydrophilically treated; and
the sixth region is on an opposite side of the third region of the sealing plate.

7. A fuel cell comprising:
a membrane electrode assembly;
a porous member that has a first surface, a second surface, and an end surface portion, the first surface and the second surface being on opposite sides of the porous member, the first surface being arranged on a cathode side of the membrane electrode assembly, the end surface portion being between an end side portion of the first surface and an end side portion of the second surface;
a sealing plate arranged along the end side portion of the first surface; and
a cathode-side separator plate arranged on the second surface, wherein
the porous member is configured to supply oxidant gas to the membrane electrode assembly through the first surface, and discharge oxidant off-gas to an oxidant off-gas discharge manifold of the fuel cell via the end surface portion;
a region of the first surface of the porous member is not hydrophilically treated;
a region of the second surface of the porous member is hydrophilically treated;
the cathode-side separator plate is flat-shaped;
the sealing plate has a third region that faces the porous member;
the cathode-side separator plate has a fourth region opposite the third region of the sealing plate via the porous member;

the fourth region of the cathode-side separator plate has a hydrophilically-treated region that is hydrophilically treated;

the hydrophilically-treated region is on an opposite side of the third region of the sealing plate; and the cathode-side separator plate has a non-hydrophilically-treated region that is not hydrophilically treated.

\* \* \* \* \*